Nov. 18, 1969  W. L. HARRIS  3,478,880
PROCESS FOR WATER TREATMENT FILTER CONDITIONING
Filed July 10, 1967
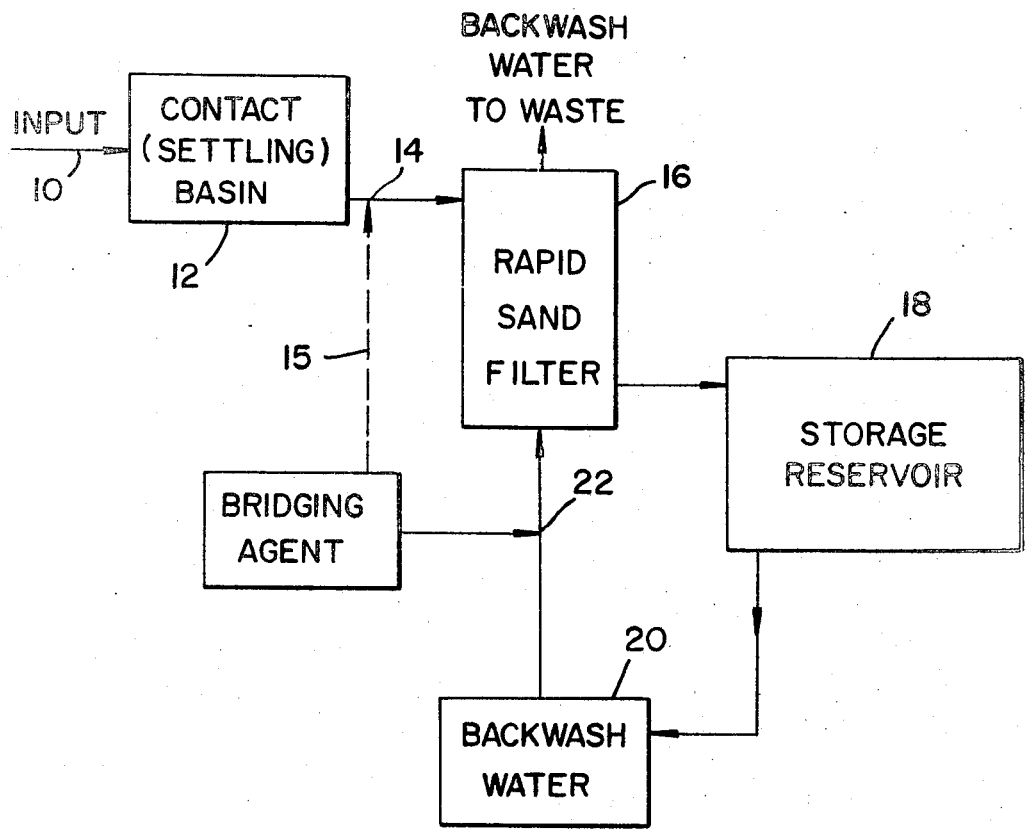
INVENTOR.
W. LESLIE HARRIS
BY
Townsend and Townsend
ATTORNEYS United States Patent Office 3,478,880
Patented Nov. 18, 1969

3,478,880
PROCESS FOR WATER TREATMENT
FILTER CONDITIONING
William Leslie Harris, Concord, Calif., assignor to Contra Costa County Water District, Concord, Calif., a corporation of California
Filed July 10, 1967, Ser. No. 652,069
Int. Cl. C02c 1/18
U.S. Cl. 210—80     3 Claims

ABSTRACT OF THE DISCLOSURE

A method of improving the filtering characteristics of a rapid sand filter in which approximately 0.01 to 0.10 p.p.m. of a polyelectrolyte bridging agent is added to the water used to backwash the filtering medium.

---

This invention relates to an improved process for conditioning rapid sand filters used in water treatment plants.

Rapid sand filters have been developed over the past 70 years to operate at a rate 25 to 50 times that of slow sand filters. Rapid sand filters are available which operate at rates of 2–4 gallons per square foot per minute. A typical modern rapid sand filter comprises a layer of coarse sand combined with crushed anthracite coal resting on a layer of gravel.

After having been in use for a period of time, rapid sand filters are backwashed, that is, water is passed through the filter in a direction opposite that of normal flow in order to agitate the filtering medium and release the entrapped dirt and other fine matter caught in the filter. Water to be treated is then passed through the filter in the usual manner.

A very real handicap in the use of rapid sand filters is the inferior quality of the water produced at the beginning of the filter run. Fine matter passes through the filter during the initial period in substantial quantities and for an extended period of time.

In order to overcome this problem and prevent the improperly filtered water from passing into the water supplies, it has been the practice to pass the initial run of water to waste. Another step has been the recycling of the water until the filter has reached optimum filtering capacity and is producing a clear effluent. Neither of these solutions has proven to be effective.

In order to increase the efficiency of filters a number of organic substances are used as filter aids. These compounds are termed binders or bridging agents because of their demonstrated ability to hold particulate matter within a filter, thus promoting greater clarity of the filter effluent. These binding agents usually are long chain high molecular weight polyelectrolytes.

The binder or bridging agent is usually added in small quantities to the influent water being fed into the rapid sand filter. Over a period of time the binding action not only serves to bind particulate matter to the filtering medium particles, but also tends to bind the particles of filtering medium to each other. This binding effect increases gradually during the run of water through the filter and results eventually in clogging of the filter so that the rate of flow is substantially decreased.

In order to overcome the clogging of the filter caused by the buildup of binder and particles, frequent backwashing of the filter is required. This frequent backwashing tends to defeat the advantage of the rapid sand filter. In addition, backwashing is a costly and time-consuming process since the quantity of water used for the backwashing varies from 1 to 10% of the output of the filter.

The present invention is based upon the discovery that the addition of a small amount of bridging agent to the backwash water results in a conditioning effect in the filtering medium. The result of the conditioning of the filtering medium during the backwash cycle is that clear water is produced from the filter from the very start of the filtering cycle.

In the pilot filter which has been used to study the effects of the use of bridging agents in the backwash water, it has been found that only a small amount of bridging agent, sufficient to effect the conditioning of the filter medium, is required. The amount will vary according to the specific conditions of water turbidity, temperature, the filtering medium, and the like. In the preferred embodiment, it has been found that the amount required is exteremely small, varying from 0.01 to 0.10 parts per million. In the experiments which have been conducted, the bridging agent has been a product known as Separan NP 10, PWG, a product of the Dow Chemical Co., Midland, Michigan. This material is described by the manufacturer as a synthetic high molecular weight polymer of acrylamide.

The use of the bridging agent in the backwash water yields three distinct advantages. First, high clarity water is produced from the very start of the filtering cycle after backwash. Second, the preconditioning technique described above permits elimination or substantial reduction of the continuous feed of binding agent to the filter influent. This latter change permits longer filter runs without breakdown of the filtering medium and without the clogging of the filters caused by the buildup of the bridging agent. Third, substantially higher rates of flow through the filter appear to be feasible after preconditioning than if the bridging agent is added to the influent.

The use of the preconditioning technique of the present invention yields substantial economic advantages. Rapid sand filters preconditioned in accordance with the invention can be used for a filtering run of substantially greater duration. The rate of flow through the filter may be substantially increased as well. For example, the typical rapid sand filter operates at a rate of 2–4 gallons per square foot per minute. Through the use of the backwash preconditioning of the present invention, filtration rates of 10 gallons per square foot per minute have been obtained. Thus, for the equivalent capital investment of a conventional filtration plant, the use of the claimed method permits as much as five times the production of high-quality treated water.

The experiments in which extremely small quantities of Separan have been added to the backwash water indicate that a matrix is established in the filtering medium. This results in a substantial decrease in the particulate matter carried in the effluent at the beginning of the filtering run. High clarity water is produced immediately from rapid sand filters conditioned in accordance with the method described. Thus, the initial flow of water from the filters may be piped directly to the storage reservoirs rather than to waste or to be recycled as was formerly necessary.

In the drawing:

The figure is a schematic diagram of a portion of a water treatment plant showing the connection of the bridging agent supply into the system.

Referring now more particularly to the drawing, raw water which has been treated with the usual coagulants, chlorine, and activated carbon is led into the contact or settling basin 12 at input point 10. In conventional water treatment plants, a bridging agent, such as Separan NP 10, PWG, is added to the water being fed from the contact basin 12 into the sand filter 16 at point 14. This is shown by the dashed connecting line 15 between the bridging agent supply and point 14.

In the conventional arrangement, water is filtered through the rapid sand filter and then led from the filter into the storage reservoir 18. It is conventional also to draw some water from the storage reservoir into a backwash water supply 20 which is used to reverse the flow through the rapid sand filter in order to clear the entrapped particulate matter.

The essence of the present invention is feeding the bridging agent into point 22, that is, into the backwash water so that the filtering medium of the rapid sand filter, usually sand and crushed anthracite coal, is conditioned by the bridging agent. The waste backwash water in either the conventional method or in the method of the present invention is led to waste.

After the backwash water containing the bridging agent in the amount of 0.01 to 0.10 p.p.m. of backwash water has been flowed in the reverse direction through the rapid sand filter, water is again led from the contact basin 12 through the rapid sand filter 16 and directly into the storage reservoir 18. In conventional systems, this initial flow of water through the rapid sand filter must be led to waste or inferior quality accepted for the reason that the filter does not accomplish efficient filtration until after a period of time has elapsed.

As a result of the treatment of the backwash water with the bridging agent, there is no need to waste any of the water passing through the filter at the start of the normal filter cycle. High clarity water is produced immediately and may therefore be led directly into the storage reservoir.

Although the invention has been described in some detail for purposes of clarity, it is to be considered limited only by the scope of the appended claims.

What is claimed is:

1. In a method for removing particulate matter from water comprising passing the water through a rapid sand filter, the improvement comprising preconditioning the filter medium by adding a long chain high molecular weight polyelectrolyte to the backwash water used to flush the filter of retained matter in an amount sufficient to precondition the filtering medium so that clear water is produced from the filter from the start of the filtering cycle.

2. An improved method for removing impurities such as turbidity from water comprising preconditioning a rapid sand filter through which the water is to be passed by passing therethrough wash water containing a long chain high molecular weight polyelectrolyte in the amount of approximately 0.01 to 0.10 p.p.m. said wash water being passed through the filter in a direction reverse from that of the water to be filtered then passing the water to be filtered through said filter.

3. The method of precoating the filtering medium in a rapid sand filter for water by flowing a solution of water and a long chain high molecular weight polyelectrolyte in the amount of approximately 0.01 to 0.10 p.p.m. through the filter in a direction opposite to that of the normal flow prior to the passage therethrough of any water to be filtered.

References Cited

UNITED STATES PATENTS

| | | | |
|---|---|---|---|
| 2,832,473 | 4/1958 | Oberholtzer | 210—80 X |
| 2,956,682 | 10/1960 | Stephan | 210—82 X |
| 3,171,801 | 3/1965 | Rice et al. | 210—82 X |
| 3,171,803 | 3/1965 | Rice et al. | 210—54 X |

REUBEN FRIEDMAN, Primary Examiner

JOHN W. ADEE, Assistant Examiner

U.S. Cl. X.R.

210—82